(12) United States Patent
Li et al.

(10) Patent No.: US 9,081,153 B2
(45) Date of Patent: Jul. 14, 2015

(54) OPTICAL FIBER CONNECTOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Zhi-Ming Li, Shenzhen (CN); Le-Peng Wei, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 230 days.

(21) Appl. No.: 13/792,221

(22) Filed: Mar. 11, 2013

(65) Prior Publication Data

US 2013/0266266 A1    Oct. 10, 2013

(30) Foreign Application Priority Data

Apr. 9, 2012    (CN) .......................... 2012 1 0100942

(51) Int. Cl.
*G02B 6/38* (2006.01)
*G02B 6/36* (2006.01)
*G02B 6/255* (2006.01)

(52) U.S. Cl.
CPC *G02B 6/381* (2013.01); *G02B 6/36* (2013.01); *G02B 6/3858* (2013.01); *G02B 6/3869* (2013.01); *G02B 6/2552* (2013.01); *G02B 6/3823* (2013.01); *G02B 6/3887* (2013.01); *G02B 6/3898* (2013.01)

(58) Field of Classification Search
CPC .............................. G02B 6/381; G02B 6/3858
See application file for complete search history.

(56) References Cited

U.S. PATENT DOCUMENTS

| | | | |
|---|---|---|---|
| 2005/0213892 A1* | 9/2005 | Barnes et al. | 385/62 |
| 2007/0104425 A1* | 5/2007 | Larson et al. | 385/86 |
| 2012/0121222 A1* | 5/2012 | Castonguay et al. | 385/78 |
| 2013/0039630 A1* | 2/2013 | Su et al. | 385/137 |
| 2013/0156384 A1* | 6/2013 | Milette et al. | 385/81 |
| 2013/0266267 A1* | 10/2013 | Li et al. | 385/78 |
| 2013/0266269 A1* | 10/2013 | Li et al. | 385/81 |
| 2013/0266272 A1* | 10/2013 | Li et al. | 385/83 |
| 2013/0266276 A1* | 10/2013 | Li et al. | 385/92 |
| 2014/0037250 A1* | 2/2014 | Treadwell et al. | 385/78 |
| 2014/0254987 A1* | 9/2014 | Caveney et al. | 385/60 |
| 2015/0043873 A1* | 2/2015 | Li et al. | 385/81 |

FOREIGN PATENT DOCUMENTS

| | | | |
|---|---|---|---|
| JP | 2001-249251 A | | 9/2001 |
| JP | 2002-72011 A | | 3/2002 |
| JP | 2012-37624 A | | 2/2012 |

* cited by examiner

*Primary Examiner* — Michelle R Connelly
(74) *Attorney, Agent, or Firm* — Novak Druce Connolly Bove + Quigg LLP (57) ABSTRACT

An optical fiber connector includes a fixing module and an optical fiber ferrule positioned at an end of the fixing module. The optical fiber connector is used for gripping a cable including an optical fiber. The optical fiber ferrule axially defines a through hole, the optical fiber is gripped in the fixing module and is partly protruded out of the optical ferrule. When the optical fiber connector is assembled to an adapter to join with another optical fiber connector, the optical fiber will be bent to elastically resist an optical fiber of the another optical fiber connector.

15 Claims, 11 Drawing Sheets

OPTICAL FIBER CONNECTOR

CROSS-REFERENCE TO RELATED APPLICATIONS

This application claims all benefits accruing under 35 U.S.C. §119 from China Patent Application No. 201210100942.8, filed on Apr. 9, 2012, in the China Intellectual Property Office, the disclosure of which is incorporated herein by reference. The application is also related to co-pending applications entitled, "OPTICAL FIBER CONNECTOR AND ASSEMBLING DEVICE FOR THE SAME" Ser. No. 13/792,215; "FIBER END SURFACE MACHINING DEVICE AND FIBER POSITION STRUCTURE THEREOF" Ser. No. 13/792,218; "FIBER MACHINING DEVICE AND ASSEMBLING METHOD FOR OPTICAL FIBER CONNECTOR"Ser. No. 13/792,219; "OPTICAL FIBER CONNECTOR" Ser. No. 13/792,222; "OPTICAL FIBER CONNECTOR" Ser No. 13/792,223; "OPTICAL FIBER CLAMPING MECHANISM AND OPTICAL FIBER CONNECTOR USING THE SAME" Ser. No. 13/792,229.

BACKGROUND

1. Technical Field

The present disclosure relates to connectors, particularly to an optical fiber connector.

2. Description of the Related Art

Fiber To The Home (FTTH) is widely used in communications field, and many optical fiber connectors are needed for connecting the optical fiber. An optical fiber connector generally includes an optical ferrule with an optical fiber stub already terminated in the optical ferrule, an optical fiber holder, and a clamp sleeve sleeved on the optical fiber holder to fasten a field optical fiber. To improve the quality of optical coupling and minimize Fresnel losses of the optical fiber connector, there are two manners of treating a joint between the optical fiber stub and the field optical fiber. In a first manner, a matching liquid is injected in the optical fiber holder. However, the matching liquid evaporates easily. In a second manner, the optical fiber stub and the field optical fiber are joined together by melting them together. However, it is not convenient to precisely join the optical fiber stub and the field optical fiber together.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
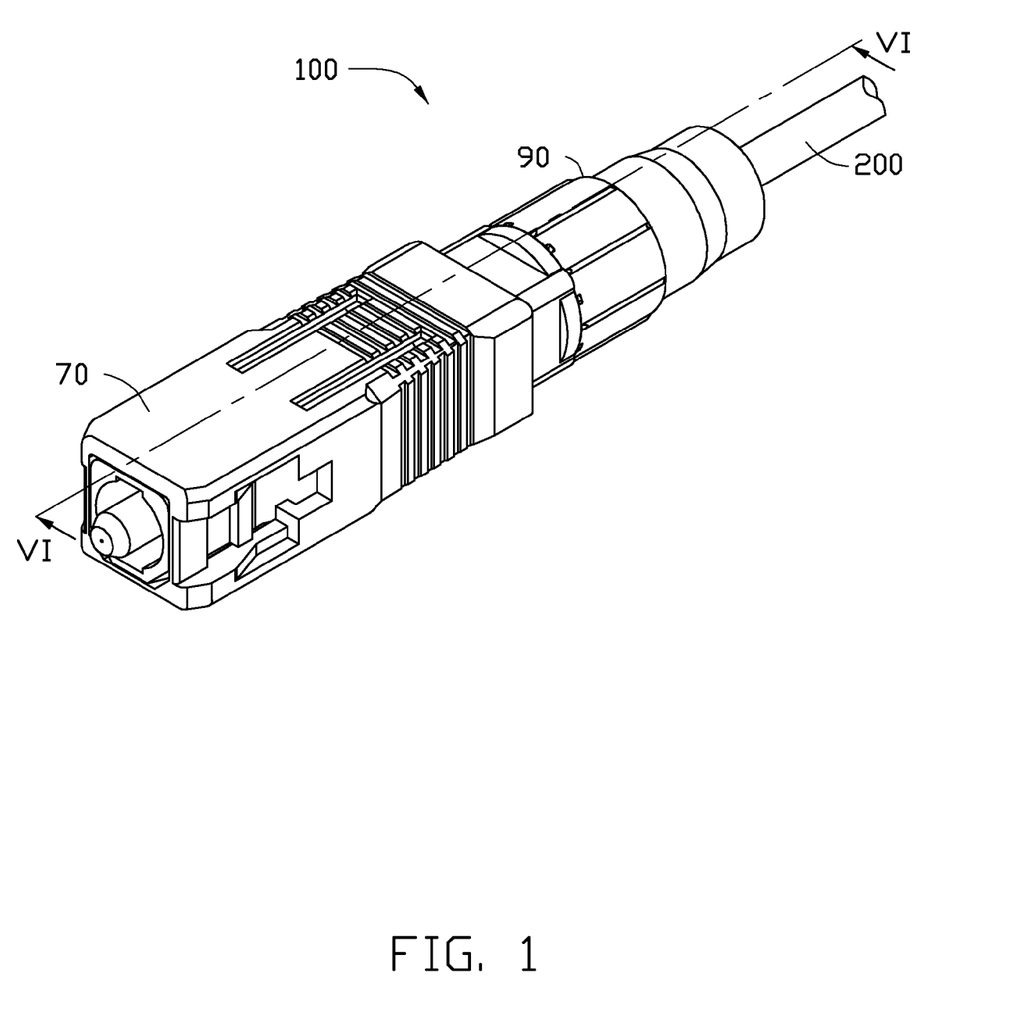
FIG. 1 is an isometric, assembled view of an embodiment of an optical fiber connector.
Figure 2:
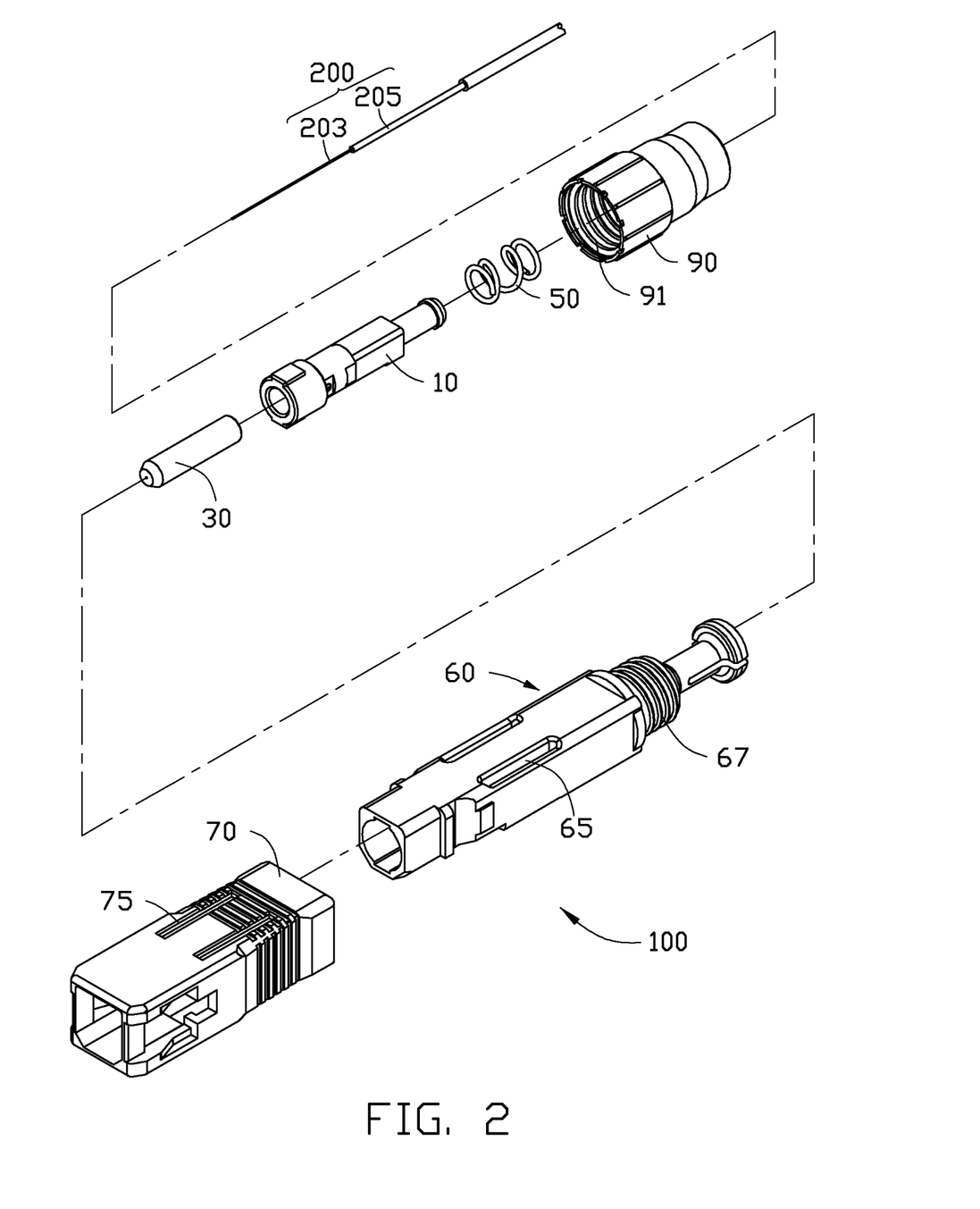
FIG. 2 is an exploded, isometric view of the optical fiber connector of FIG. 1 including a fixing module.

FIGS. 1 and 2 show an embodiment of an optical fiber connector 100 for gripping a cable 200. The optical fiber connector 100 includes a fixing module 10, an optical fiber ferrule 30, an elastic member 50, an inner housing 60, an outer housing 70, and a boot 90. The optical fiber ferrule 30 is positioned to one end of the fixing module 10. The elastic member 50 is sleeved on the other end of the fixing module 10 away from the optical fiber ferrule 30. The inner housing 60 is sleeved on the fixing module 10. The outer housing 70 is sleeved on the inner housing 60. The boot 90 is sleeved on an end of the inner housing 60 away from the outer housing 70. In the illustrated embodiment, the optical fiber connector 100 is a Subscriber Connector (SC) optical fiber connector. The cable 200 includes an optical fiber 203 and a coating 205 formed on the optical fiber 203. In order to facilitate the cable 200 being gripped in the optical fiber connector 100, part of the coating 205 are removed for exposing the optical fiber 203.

Figure 3:
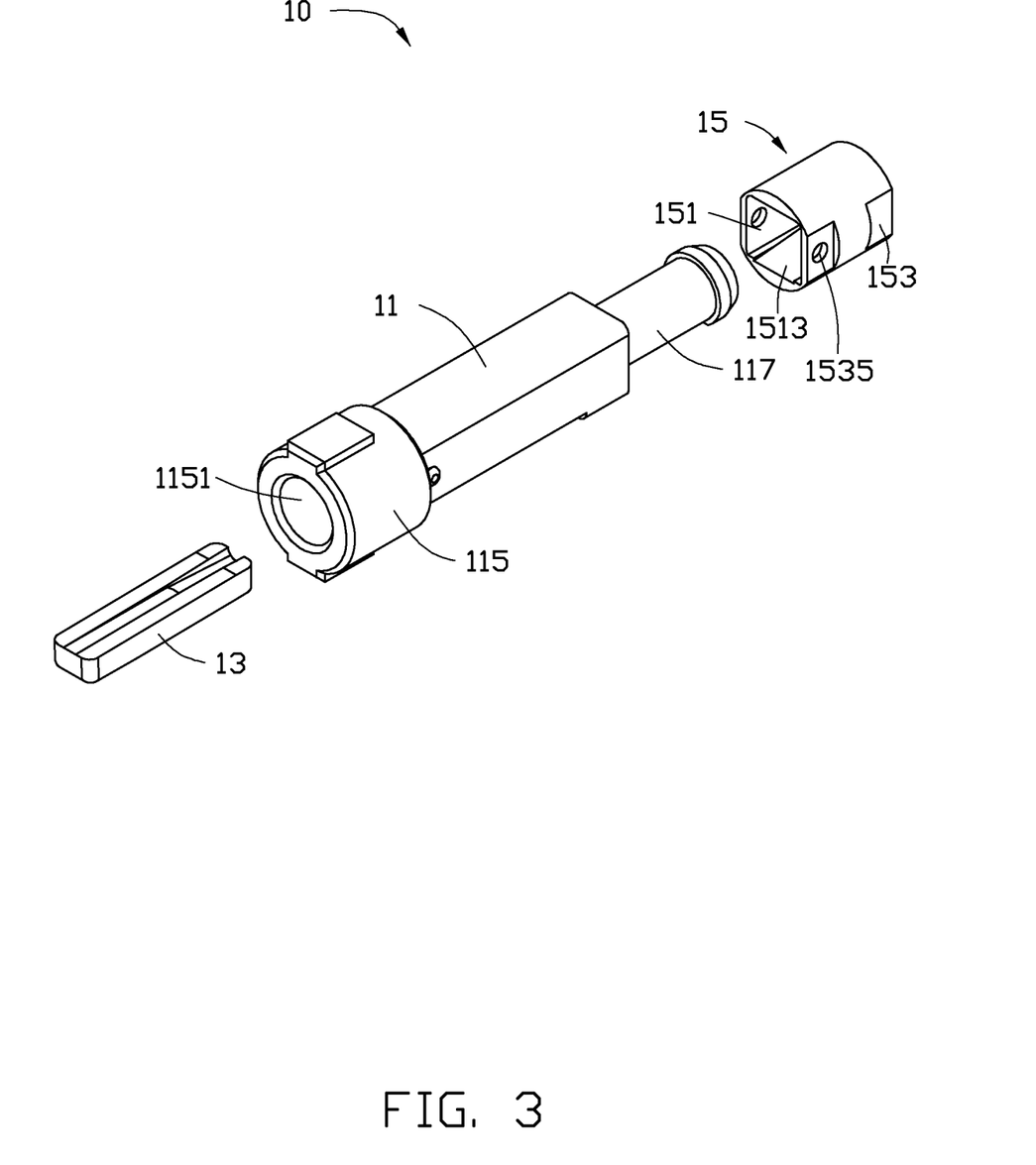
FIG. 3 is an exploded, isometric view of the fixing module of FIG. 2 including a fastening member.
Figure 4:
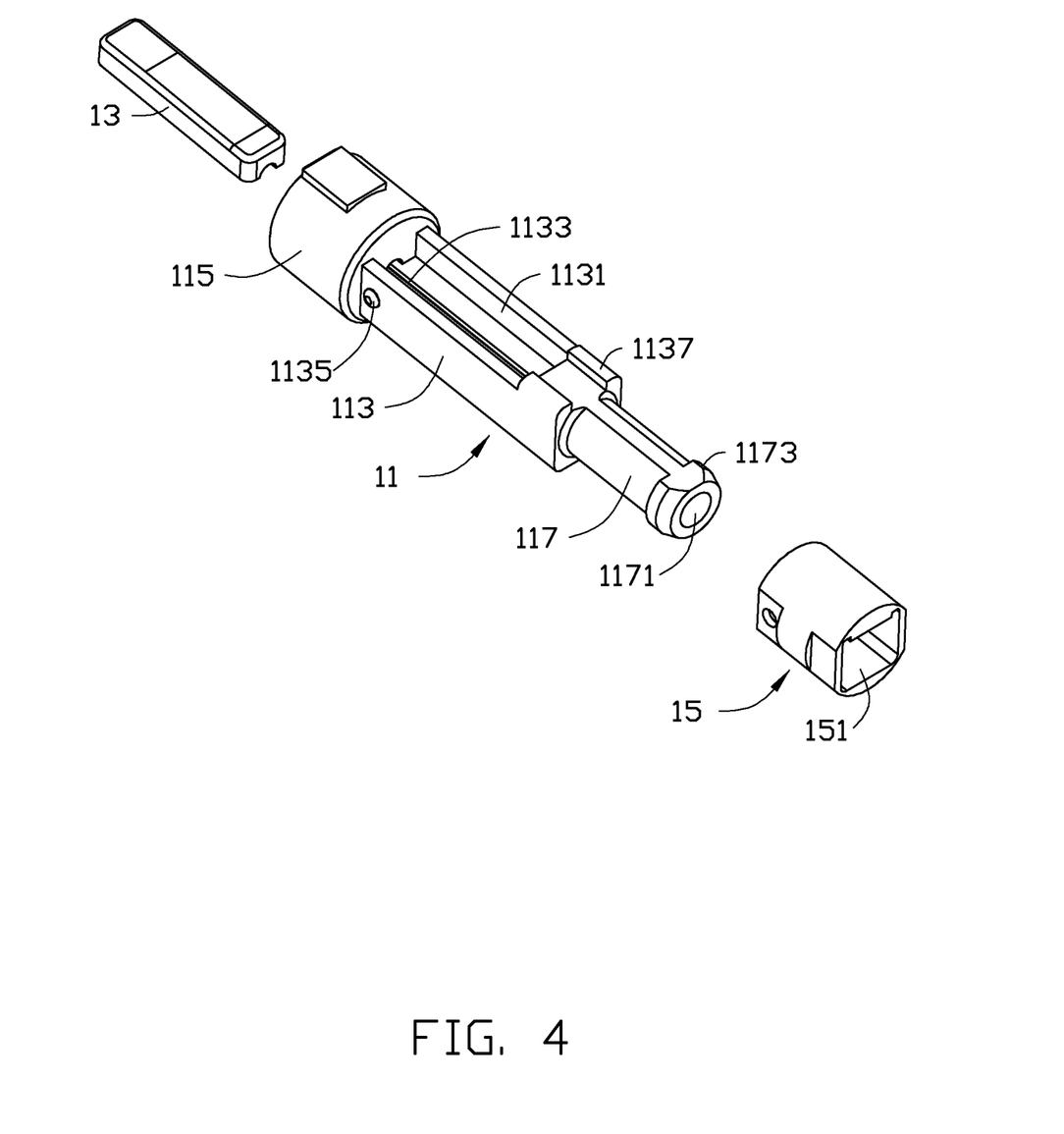
FIG. 4 is similar to FIG. 3, but viewed from another aspect.
Figure 5:
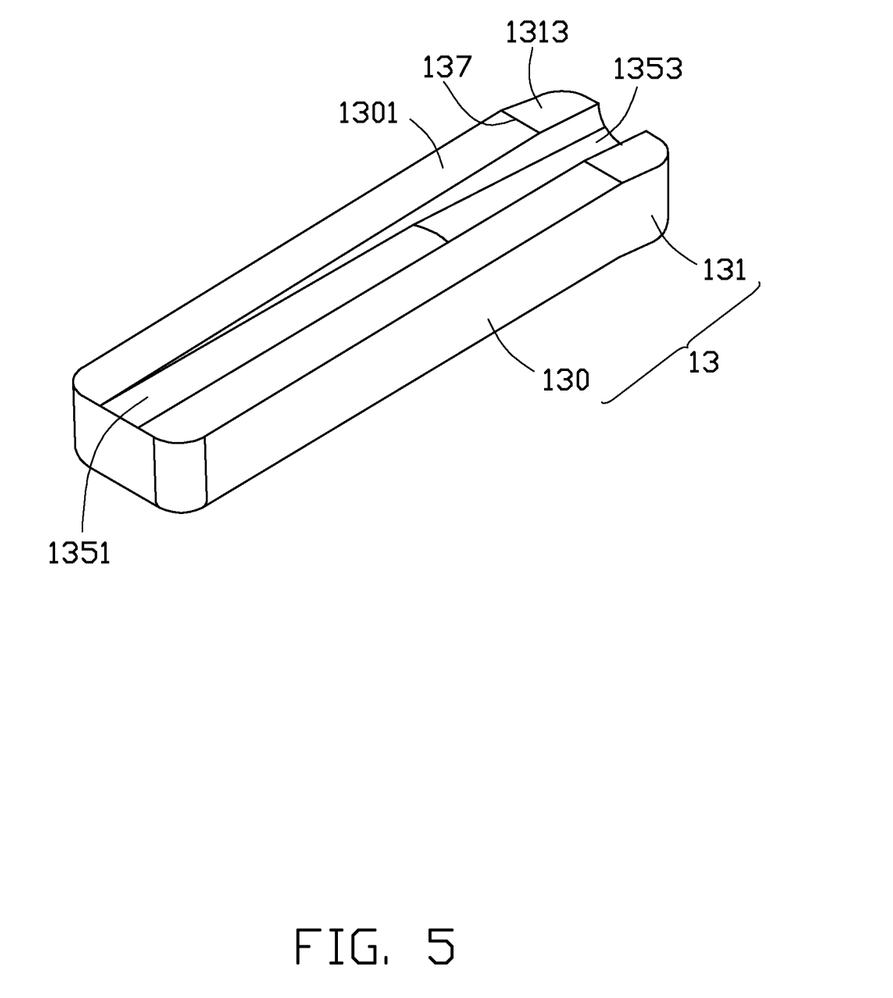
FIG. 5 is an enlarged, isometric view of the fastening member of FIG. 3.

FIGS. 3 to 5 show an embodiment of a fixing module 10. The fixing module 10 is a sleeve. The fixing module 10 includes a support member 11, a fastening member 13 mating with the support member 11, and a locking member 15. The locking member 15 is sleeved on the support member 11 and the fastening member 13 for gripping the optical fiber 203.

The support member 11 is substantially cylindrical. The support member 11 includes a fixing portion 113, a first assembling portion 115, and a second assembling portion 117. The first assembling portion 115 and the second assembling portion 117 extend outward from opposite ends of the fixing portion 113. The second assembling portion 117 forms a latching portion 1173 protruding from the outer surface of the second assembling portion 117 adjacent to an end of the second assembling portion 117 away from the fixing portion 113.

In the illustrated embodiment, a cross section of the fixing portion 113 is rectangular, and the fixing portion 113 defines a receiving portion 1131 for receiving the fastening member 13. The fixing portion 113 further defines a first restricting groove 1133 in the bottom of the receiving portion 1131 extending in a direction substantially parallel to an optical axis of the optical fiber connector 100. The first restricting groove 1133 is a V-shaped groove. In other embodiments, the first restricting groove 1133 can also be an arc groove. The fixing portion 113 forms a pair of protrusions 1135 protruding from opposite sides of the fixing portion 113 adjacent to the first assembling portion 115. The protrusions 1135 are located at opposite sides of the receiving portion 1131. The fixing portion 113 further forms a pair of stoppers 1137 at an end of the fixing portion 113 adjacent to the second assembling portion 117 for restricting the slide of the locking member 15. The first assembling portion 115 axially defines an assembling hole 1151 communicating with the first restricting groove 1133. The second assembling portion 117 axially defines a receiving hole 1171 communicating with the first restricting groove 1133. Both a diameter of the assembling hole 1151 and a diameter of the receiving hole 1171 are larger than a width of the first restricting groove 1133.

The fastening member 13 is received in the receiving portion 1131 of the support member 11, and mates with the support member 11 to fasten the optical fiber 203 of the cable 200. The fastening member 13 includes a first resisting portion 130 and a second resisting portion 131 slantingly connected with the first resisting portion 130. The second resisting portion 131 includes a second resisting surface 1313 facing the bottom of the receiving portion 1131 and adjacent to the stoppers 1137. The first resisting portion 130 includes a first resisting surface 1301 facing the bottom of the receiving portion 1131 and connecting with the second resisting surface 1313. When the locking member 15 slides along the fixing portion 113, the first resisting surface 1301 and the second resisting surface 1313 resists the bottom of the receiving portion 1131 in turn. The first resisting surface 1301 defines a second restricting groove 1351 corresponding to the first restricting groove 1133. The second resisting surface 1313 defines a guiding groove 1353 communicating with the second restricting groove 1351 for facilitating the insertion of the optical fiber 203 into the fixing module 10. The bottom of the guiding groove 1353 is a slanted surface, the guiding groove 1353 is deeper than the second restricting groove 1351, and the depth of the guiding groove 1353 gradually increases from the end adjacent to the second restricting groove 1351 to the other end. In the illustrated embodiment, the first resisting surface 1301 and the second resisting surface 1313 are both flat surfaces intersecting at an adjoining line 137. In alternative embodiments, an arc surface is located between the first resisting surface 1301 and the second resisting surface 1313.

In an alternative embodiment, the second resisting surface 1313 can be omitted, and the optical fiber 203 fixed in the fixing module 10 by means of the first resisting surface 1301 resisting the optical fiber 203.

In an alternative embodiment, the guiding groove 1353 is formed at an end of the receiving portion 1131 adjacent to the second resisting surface 1313.

Referring to FIGS. 3 and 4 again, the locking member 15 is substantially a sleeve. The locking member 15 axially defines a through hole 151 mating with a cross section of the fixing portion 113 of the support member 11. The locking member 15 forms two pairs of gripping portions 153 at outer surfaces of the locking member 15. One pair of the gripping portions 153 define a pair of locking holes 1535 corresponding to the pair of protrusions 1135. A slanted surface 1513 is formed at an inner surface of the locking member 15 adjacent to an end of the locking member 15, the slanted surface 1513 is formed between the pair of locking holes 1535, and a diameter of the through hole 151 adjacent to the second assembling portion 117 is larger than a diameter of the through hole 151 away from the second assembling portion 117.

Figure 6:
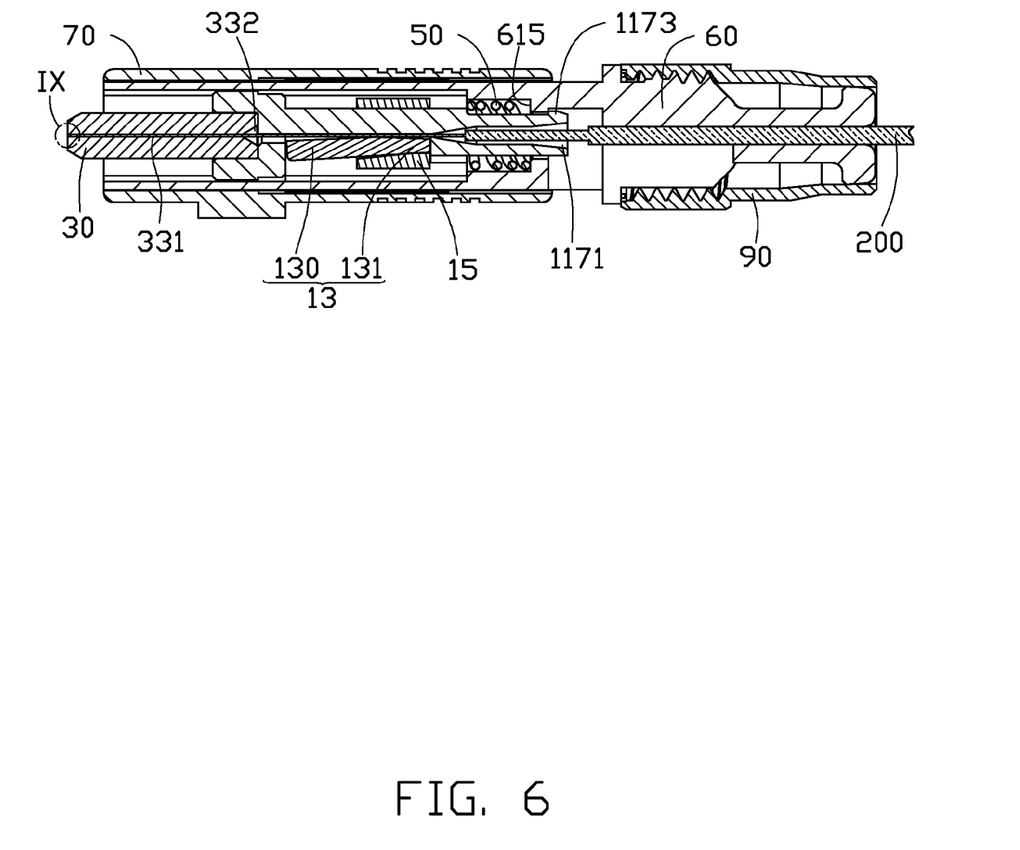
FIG. 6 is a cross-sectional view of the optical fiber connector of FIG. 1 taken along the line VI-VI, showing the fixing module at an ungripped state.

Also referring to FIG. 6, the optical fiber ferrule 30 is substantially cylindrical, and is made of ceramic materials. The optical fiber ferrule 30 axially defines a through hole 331 for receiving the optical fiber 203. The optical fiber ferrule 30 further defines a guiding hole 332 communicating with the through hole 331 in an end of the optical fiber ferrule 30 for facilitating the insertion of the optical fiber 203 into the through hole 331. In the illustrated embodiment, a diameter of the through hole 331 is a little larger than a diameter of the optical fiber 203, to facilitate passing the optical fiber 203 through. The guiding hole 332 can be substantially funnel shaped with a smaller end of the guiding hole 332 communicating with the through hole 331, which can prevent the optical fiber 203 from breaking when being bent at a distal end of the through hole 331.

The elastic member 50 is a compression spring sleeved on the second assembling portion 117 in the embodiment. The inner housing 60 defines a pair of sliding grooves 65 in a sidewall thereof extending in a direction substantially parallel to the optical axis of the optical fiber connector 100. The inner housing 60 has an external thread 67 at an end thereof. The inner housing 60 further forms a locking portion 615 (as shown in FIG. 7) at an inner surface thereof corresponding to the latching portion 1173.

The outer housing 70 is shaped to facilitate to installation of the optical fiber connector 100 into an SC adapter (not shown) in the embodiment. In alternative embodiments, the outer housing 70 can be shaped to facilitate the installation of the optical fiber connector 100 to other types of adapters. The outer housing 70 defines a pair of operating grooves 75 communicating with the pair of sliding grooves 65 of the inner housing 60. The boot 90 forms an internal thread 91 corresponding to the external thread 67 of the inner housing 60. The boot 90 fastens on an end of the inner housing 60 over the external thread 67.

Figure 7:
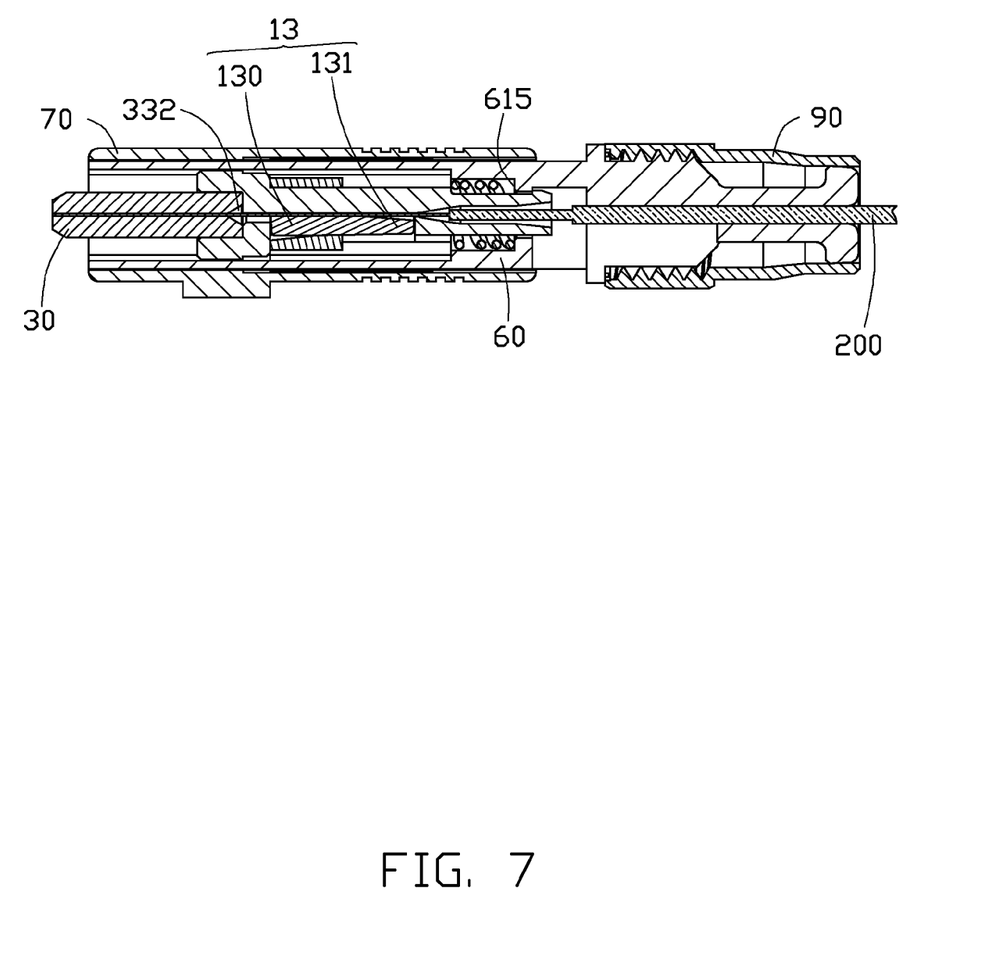
FIG. 7 is similar to FIG. 6, but showing the fixing module at a gripped state.

Referring to FIGS. 6 and 7, in assembly of the optical fiber connector 100, the fastening member 13 is received in the receiving portion 1131 of the support member 11. The locking member 15 is sleeved on an end of the support member 11 adjacent to the second assembling portion 117 (as seen in FIG. 6). The optical fiber ferrule 30 is fastened in the assembling hole 1151 of the fixing module 10. The elastic member 50 is sleeved on the second assembling portion 117. The fixing module 10 is assembled in the inner housing 60 with the latching portion 1173 engaging with the locking portion 615. One end of the elastic member 50 resists the locking portion 615, and the other end of the elastic member 50 resists a distal end of the fixing portion 113. The outer housing 70 is sleeved on the inner housing 60 with the pair of operating grooves 75 communicating with the pair of sliding grooves 65. Finally, the boot 90 is fastened on a distal end of the inner housing 60 away from the outer housing 70.

Figure 8:
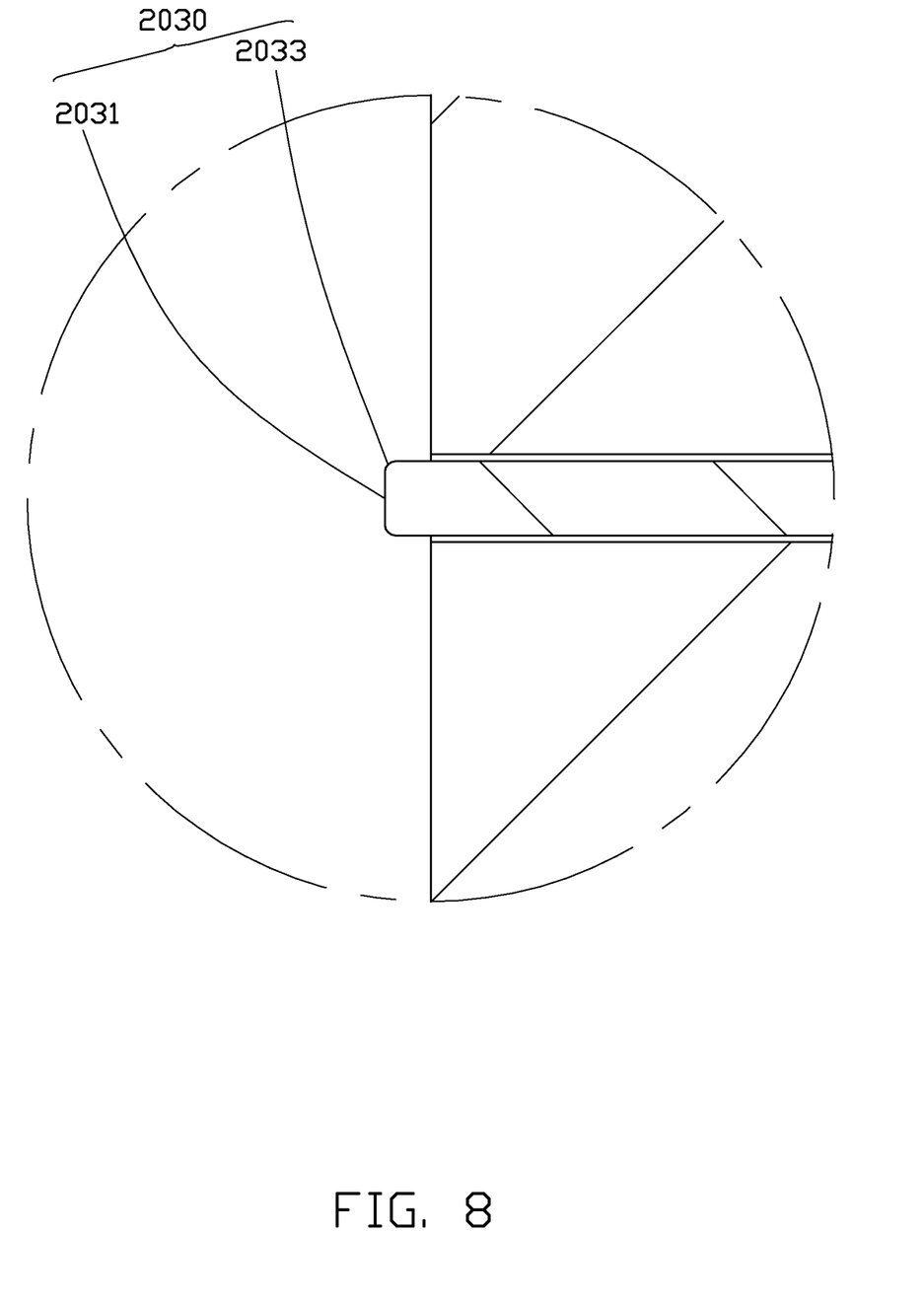
FIG. 8 is an enlarged view of a circled portion IX of FIG. 6.
Figure 11:
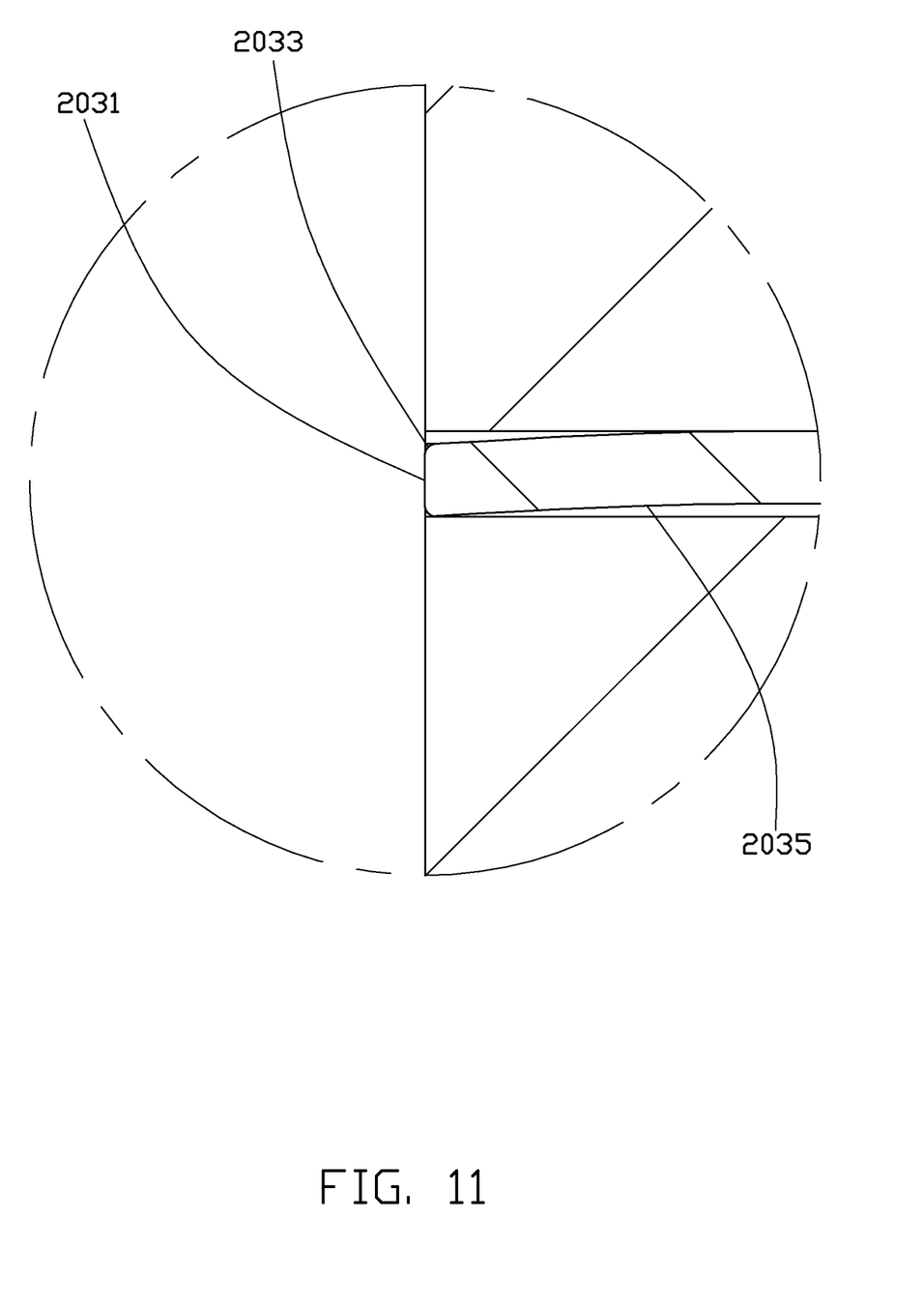
FIG. 11 is similar to FIG. 8, but showing the optical fiber connector received in an adapter.

Referring to FIGS. 8 and 11, the optical fiber 203 includes an end surface 2030. The optical fiber 203 may have a plurality of depressions, a plurality of cracks, a plurality of burrs, or a plurality of scratches at the end surface 2030 of the optical fiber 203 which has been cut, and any of these defects will increase a light loss and affect the efficiency of a data transmission of the optical connector 100. To increase the efficiency of the data transmission of the optical connector 100, the end surface 2030 is treated by heating to form a smooth, rounded configuration. The end surface 2030 of the optical fiber 203 includes a flat surface 2031 at a center thereof and a rounded shoulder 2033 surrounding the flat surface 2031.

In alternative embodiments, the configuration of the end surface 2030 of the optical fiber 203 can be an arc configuration, a spherical configuration, or the like.

Referring to FIGS. 1 to 7, in use of the optical fiber connector 100, the boot 90 is taken off from the inner housing 60, and the optical fiber 203 of the cable 200 is inserted into the fixing module 10 from a distal end of the boot 90 away from the outer housing 70. In an initial state, the locking member 15 is located at an end of the fixing portion 113 adjacent to the second assembling portion 117, the second resisting surface 1313 resists against the bottom of the receiving portion 1131, and the first resisting surface 1301 is warped to form a gap (as seen in FIG. 6) between the first resisting surface 1301 and the bottom of the receiving portion 1131. The optical fiber 203 is inserted into the fixing module 10, and a length of the optical fiber 203 protruding out of the optical fiber ferrule 30 is controlled to be in a range from about 2 μm to about 4 μm. In the illustrated embodiment, the length of the optical fiber 203 protruding out of the optical fiber ferrule 30 is 3 μm.

Figure 9:
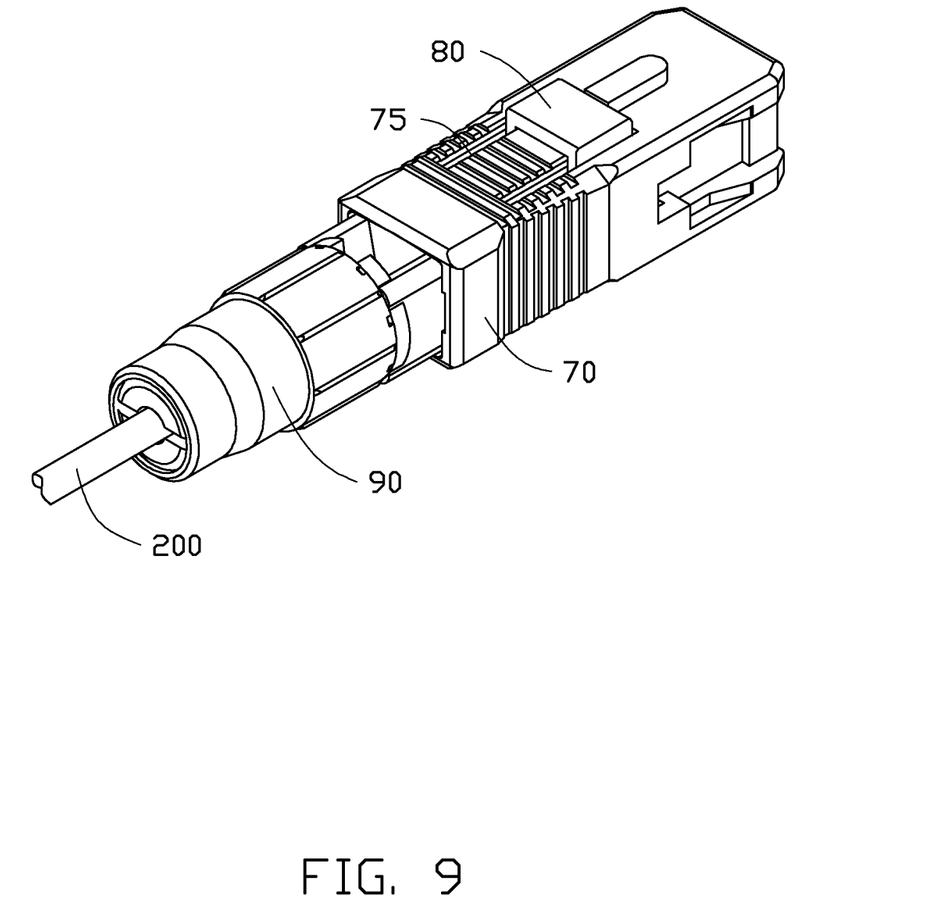
FIG. 9 is an assembled, isometric view of the optical fiber connector of FIG. 1 clamped by an assembly tool.
Figure 10:
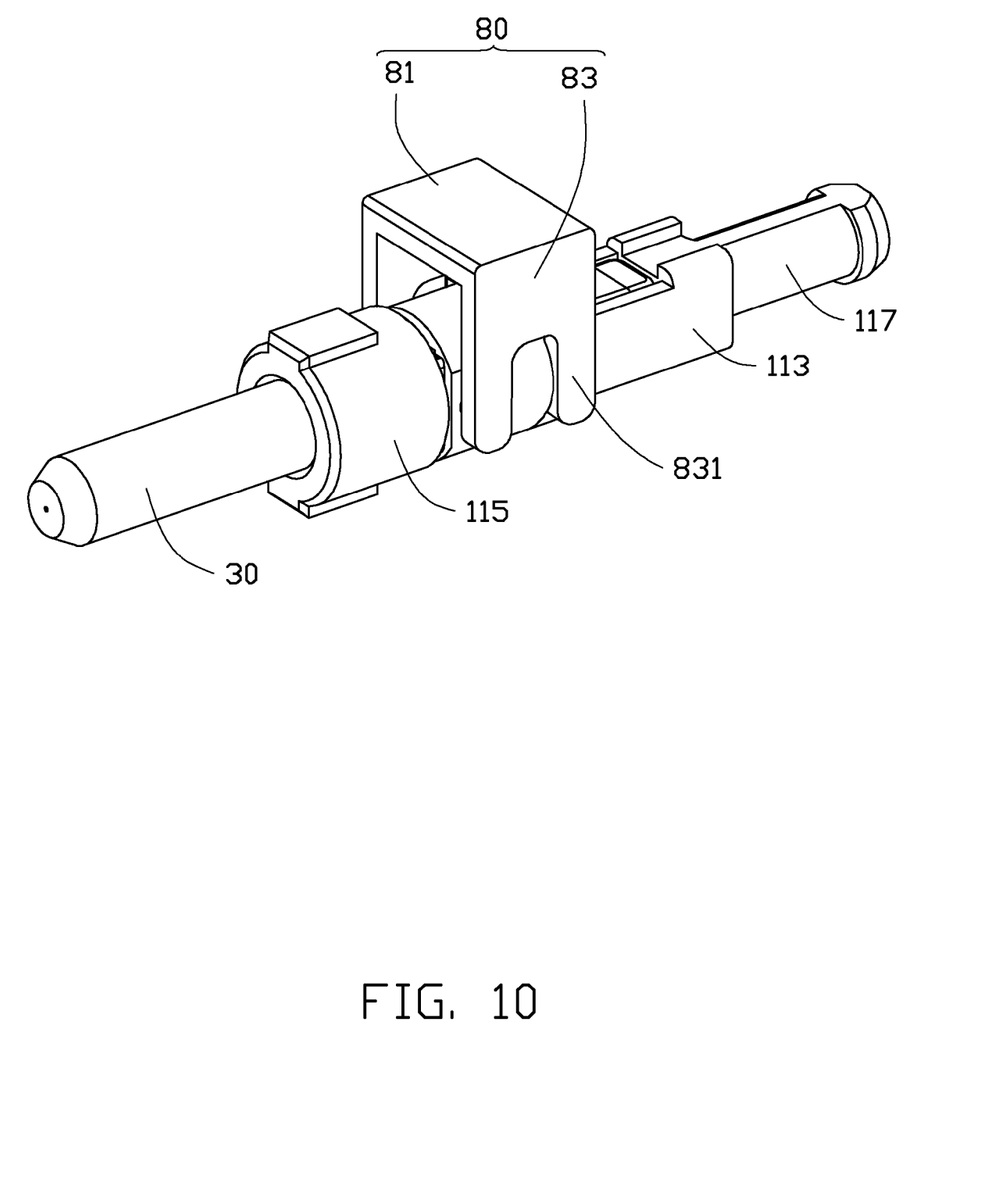
FIG. 10 is an isometric view of the fixing module of FIG. 2 clamped by an assembly tool.

In order to slide the locking member 15, an assembling tool 80, as shown in FIGS. 9 and 10, is needed. The assembling tool 80 is substantially U-shaped. The assembling tool 80 includes a base portion 81 and a pair of elastic arms 83 extending substantially perpendicularly from opposite ends of the base portion 81. Each of the pair of elastic arms 83 includes a pair of elastic portions 831. In use, the pair of elastic arms 83 are passed through the pair of operating grooves 75 and the pair of sliding grooves 65 successively, and the elastic arms 83 latch with the two pairs of gripping portions 153. An operator slides the assembling tool 80 along the pair of operating grooves 75 to slide the locking member 15 towards an end of the fixing portion 113 adjacent to the first assembling portion 115 until the pair of locking holes 1535 engage with the pair of protrusions 1135. The first resisting surface 1301 resists the bottom of the receiving portion 1131 to fix in place the optical fiber 203 received in the first restricting groove 1133. The boot 90 is fastened on a distal end of the inner housing 60 to fasten on and secure the outer coating 86 of the cable 200.

The pair of locking holes 1535 engaging with the pair of protrusions 1135 prevent the locking member 15 from sliding. In an alternative embodiment, the pair of locking holes 1535 and the pair of protrusions 1135 can be omitted.

When the optical fiber 203 needs to be removed from the optical fiber connector 100, the locking member 15 is slid via the assembling tool 80 to its initial state and the boot 90 taken off. The assembling tool 80 should be taken off the optical fiber connector 100 when the optical fiber connector 100 is in a state of use, but the locking member 15 cannot be slid along the fixing module 10 without the assembling tool 80, which prevents the optical connector 100 from being knocked off by accident, and ensures the optical fiber 203 is firmly fixed in the fixing module 10.

The end surface 2030 of the optical fiber 203 is smoothed by heating, which increases the contact area between the optical fiber 203 and another optical fiber abutting the optical fiber 203. A length of the optical fiber 203 protruding out of the optical fiber ferrule 30 is controlled to be in a range from about 2 μm to about 4 μm. When the optical connector 100 is assembled on an adapter (not shown) to join with another optical fiber connector (not shown), the end surface 2030 of the optical fiber 203 of the optical fiber connector 100 resists the end surface of the optical fiber of the other optical fiber connector, and a part of the optical fiber 203 received in the optical fiber ferrule 30 is bent to form a curved structure 2035 (see in FIG. 11), which puts the two end surfaces in continuous contact with each other. In addition, the end surface 2030 of the optical fiber 203 will be enlarged after the end surface 2030 of the optical fiber 203 has been treated, and the diameter of the end surface 2030 of the optical fiber 203 is nearly the same as the diameter of the through hole 331. Resisting on the end surface of the optical fiber of the other optical fiber connector, the end surface 2030 of the optical fiber 203 will be firmly received in the through hole 331 of the optical fiber ferrule 30.

The optical fiber 203 is passed through the optical fiber connector 100 from a distal end of the boot 90 to a distal end of the optical fiber ferrule 30 away from the boot 90, and the end surface 2030 of the optical fiber 203 protrudes out of a distal end of the optical fiber ferrule 30. The optical connector 100 is different from a field installable connector with an optical fiber stub already terminated in the optical ferrule. The optical connector 100 avoids the need to join segments, which improves the quality of optical coupling and minimizes Fresnel losses.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical fiber connector comprising:
an optical fiber ferrule axially defining a through hole; and
a fixing module for gripping a cable comprising an optical fiber, the fixing module comprising:
a support member comprising a fixing portion, the fixing portion defining a receiving portion;
a fastening member received in the receiving portion, the fastening member comprising a first resisting portion and a second resisting portion slantingly connected with the first resisting portion; and
a locking member sleeved on the fixing portion, wherein the optical fiber ferrule is positioned in an end of the support member adjacent to the first resisting portion, the first resisting portion comprises a first resisting surface facing the bottom of the receiving portion, the second resisting portion comprises a second resisting surface facing the bottom of the receiving portion and connecting to the first resisting surface, the second resisting surface defines a guiding groove for facilitating the insertion of the optical fiber into the fixing module, the optical fiber is received in the fixing module and the through hole of the optical ferrule with a length of the optical fiber protruding out of the optical ferrule, and the first resisting surface and the second resisting surface resists the bottom of the receiving portion in turn as the locking member slides along the fixing portion.

2. The optical fiber connector of claim 1, wherein the length of the optical fiber of the cable protruding out of the optical fiber ferrule is controlled to be in a range from about 2 μm to about 4 μm.

3. The optical fiber connector of claim 2, wherein the support member further comprises a first assembling portion and a second assembling portion extending from opposite ends of the fixing portion, the first assembling portion axially defines an assembling hole communicating with the first restricting groove, the second assembling portion axially defines a receiving hole communicating with the first restricting groove, and both a diameter of the assembling hole and a diameter of the receiving hole are larger than a width of the restricting groove.

4. The optical fiber connector of claim 1, wherein the length of the optical fiber of the cable protruding out of the optical fiber ferrule is about 3 μm.

5. The optical fiber connector of claim 1, wherein the optical fiber of the cable comprises an end surface, and the end surface comprises a flat surface at a center thereof and a rounded shoulder surrounding the flat surface.

6. The optical fiber connector of claim 1, wherein the optical ferrule further defines a guiding hole communicating with the through hole in an end thereof for facilitating the insertion of the optical fiber of the cable into the through hole.

7. The optical fiber connector of claim 1, wherein the fixing portion defines a first restricting groove in the bottom of the receiving portion extending in a direction substantially parallel to the optical axis of the optical fiber connector.

8. The optical fiber connector of claim 1, wherein the locking member axially defines a through hole mating with the cross section of the fixing portion of the support member, and the locking member forms two pairs of gripping portions at outer surfaces of the locking member.

9. The optical fiber connector of claim 8, wherein the fixing portion forms a pair of protrusions protruding out from opposite sides of the fixing portion adjacent to the first assembling portion, one pair of the gripping portions define a pair of locking holes for engaging with the pair of protrusions.

10. The optical fiber connector of claim 9, wherein the locking member further comprises a slanted surface formed at an inner surface of the locking member adjacent to an end of the locking member, the slanted surface is located between the pair of locking holes, and a diameter of the through hole adjacent to the second assembling portion is larger than a diameter of the through hole away from the second assembling portion.

11. The optical fiber connector of claim 1, wherein the second assembling portion forms a latching portion protruding out from the outer surface of the second assembling portion away from the fixing portion, the optical fiber connector further comprises an inner housing sleeved on the fixing module, and the inner housing forms a locking portion at an inner surface thereof latching with the latching portion.

12. The optical fiber connector of claim 11, wherein the inner housing defines a pair of sliding grooves in a sidewall thereof extending in a direction substantially parallel to the optical axis of the optical fiber connector.

13. The optical fiber connector of claim 12, further comprising an outer housing sleeved on the inner housing, wherein the outer housing defines a pair of operating grooves communicating with the pair of sliding groove of the inner housing.

14. The optical fiber connector of claim 11, further comprising an elastic member sleeved on the second assembling portion, wherein one end of the elastic member resists the locking portion, and the other end of the elastic member resists a distal end of the fixing portion.

15. The optical fiber connector of claim 11, wherein the inner housing forms an external thread at an end thereof, the optical fiber connector further comprises a boot, the boot forms an internal thread corresponding to the external thread of the inner housing, and the boot is fastened on an end of the inner housing via the external thread matching with the internal thread.

\* \* \* \* \*